United States Patent [19]

Sato et al.

[11] Patent Number: 4,835,671
[45] Date of Patent: May 30, 1989

[54] COMMUNICATION CONTROL UNIT PROVIDING ISOLATION OF FAILURE CONDITION OF ELECTRONIC CONTROL UNIT

[75] Inventors: Yoshihisa Sato, Nagoya; Yugi Hirabayashi, Aichi; Katsuhiro Ina, Okazaki; Katsunori Ito, Aichi; Susumu Akiyama, Kariya; Takao Saito, Nagoya; Tetsuo Tanigawa, Toyota, all of Japan

[73] Assignees: Nippondenso Co., Ltd., Kariya; Toyota Jidosha Kabushiki Kaisha, Toyota, both of Japan

[21] Appl. No.: 98,048

[22] Filed: Sep. 17, 1987

[30] Foreign Application Priority Data

Sep. 19, 1986 [JP] Japan .................... 61-223415

[51] Int. Cl.$^4$ .................... G05B 9/02; H02H 7/00
[52] U.S. Cl. .................... 364/186; 364/184; 371/9; 371/14; 371/61; 371/68
[58] Field of Search .................... 364/186, 184; 371/9, 371/12, 14, 61, 68; 123/479

[56] References Cited

U.S. PATENT DOCUMENTS

| | | | |
|---|---|---|---|
| 4,161,027 | 7/1979 | Russell | 364/186 |
| 4,355,359 | 10/1982 | Kanegae et al. | 371/62 |
| 4,541,386 | 9/1985 | Kishi et al. | 123/479 |
| 4,583,176 | 4/1986 | Yamato et al. | 364/431.11 |
| 4,752,930 | 6/1988 | Kitamura et al. | 371/12 |

FOREIGN PATENT DOCUMENTS

| | | |
|---|---|---|
| 0127072 | 12/1984 | European Pat. Off. |
| 61-103341 | 5/1986 | Japan . |
| 2041581 | 9/1980 | United Kingdom . |
| 2156543 | 10/1985 | United Kingdom . |

OTHER PUBLICATIONS

"Local Area Network Technology Applied to Automotive Electronic Communications", by Ronald W. Cox; 1984, IEEE, pp. 71-77.
"A Small Area Network for Cars", by Ronald L. Mitchell; Feb. 27, 1984, pp. 177-184.

Primary Examiner—Jerry Smith
Assistant Examiner—P. Gordon
Attorney, Agent, or Firm—Cushman, Darby & Cushman

[57] ABSTRACT

A communication control unit for controlling communication between an electronic control unit and other equipment or other electronic control units, the communication control unit functioning to judge whether or not the operation of the electronic control unit is normal and, if it is judged that the electronic control unit is operating abnormally, the communication control unit acts to reset the electronic control unit to an initial operating status in order to attempt recovery from the abnormal condition, while halting transmission by the electronic control unit until it is judged that the electronic control unit has commenced to operate normally.

3 Claims, 4 Drawing Sheets

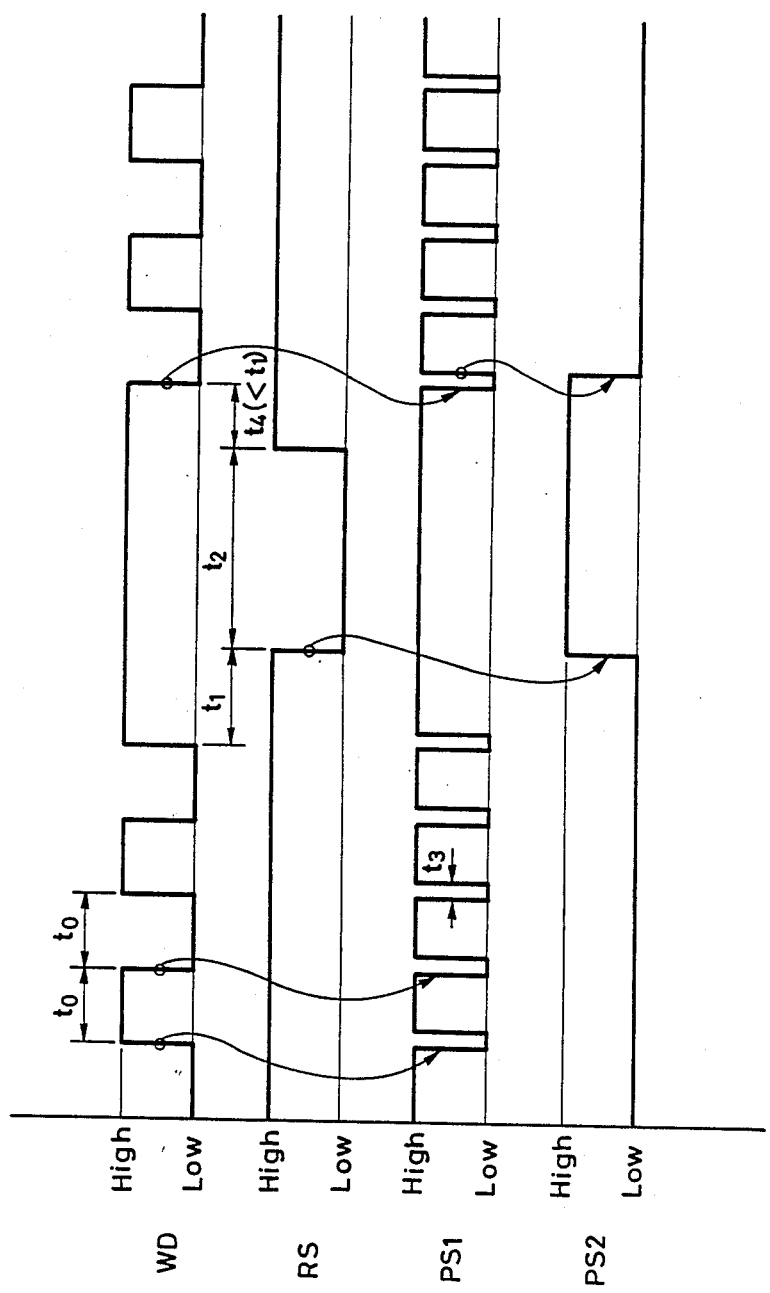

COMMUNICATION CONTROL UNIT PROVIDING ISOLATION OF FAILURE CONDITION OF ELECTRONIC CONTROL UNIT

BACKGROUND OF THE INVENTION

The present invention relates to a communication control unit for controlling communication between an electronic control unit and other equipment.

Substantial advances have been made in recent years in the field of electronic control executed by microprocessors and the like, and highly accurate control of various types of equipment has been attained. In this respect, communication between an electronic control unit which utilizes such a microprocessor and other equipment (e.g. one or more other electronic control units) is extremely important. For example in the case of recently produced types of motor vehicles, control of various units of equipment installed in the vehicle is executed by means of electronic control units. A plurality of such electronic control units can be mutually coupled by a data link so that data which is supplied to one electronic control unit from a source such as a sensor can also be supplied to other electronic control units or equipment.

Such communication between an electronic control unit and other units of equipment, or between on electronic control unit and another, is generally carried out by using communication control units. One communication control unit may be formed integrally with each electronic control unit, or a communication control unit may be coupled to an electronic control unit to be controlled thereby. This has the advantage of ease of implementing the communication function, while in addition, if the communication control unit is formed integrally with the electronic control unit, the additional advantage is obtained of increased general applicability. However, the following problems also arise.

Specifically, in the case in which a communication control unit is formed integrally with an electronic control unit, e.g., in which each electronic control unit incorporates a microprocessor and the functions of the communication control unit are implemented by the operation of the microprocessor, if a failure status occurs in the electronic control unit due to the effects of electrical noise or to occurrence of component failure, etc., then the effects of this failure status will be transferred from that electronic control unit to other equipment or other electronic control units. As a result, the trouble resulting from this failure condition may become widely disseminated to other equipment, in spite of the fact that a communication control unit is utilized in the electronic control unit which has failed.

When one or more of such electronic control units are used in a motor vehicle, then such a widespread dissemination of trouble resulting from failure of a single electronic control unit can have extremely serious consequences, since various major operating function of the vehicle will generally be controlled on the basis of data produced from the electronic control units. Thus, an improvement in this respect is necessary in order to attain increased safety of operation of such a motor vehicle.

It is an objective of the present invention to provide a communication control unit which will overcome the problem described above, whereby in the event that a failure condition occurs in an electronic control unit, protection is provided such that this failure status will have no effect upon other equipment or other electronic control units which are connected to the faulty electronic control unit.

SUMMARY OF THE INVENTION

A communication control unit according to the present invention for controlling communication between an electronic control unit and other equipment has the basic configuration shown in FIG. 1, and essentially comprises:

judgement means (M1) for judging whether the operation of the electronic control unit is normal; and transmission halting means (M2) for acting, if it is judged by the judgement means (M1) that the electronic control unit is abnormal, to reset the electronic control unit and to halt transmission by the electronic control unit until it is judged by the judgement means (M1) that the electronic control unit has commenced to operate normally.

The judgement means (M1) which serves to judge whether the electronic control unit is operating normally may have various configurations. Preferably, the judgement means acts to produce a periodically occurring output signal from the electronic control unit so long as the electronic control unit is operating normally. A signal of this type which is specifically generated for the purpose of monitoring an electronic circuit is generally referred to as a watchdog signal.

BRIEF DESCRIPTION OF THE DRAWINGS

FIG. 4 is a timing chart for illustrating the operation of the embodiment.

DESCRIPTION OF PREFERRED EMBODIMENT

Figure 1:
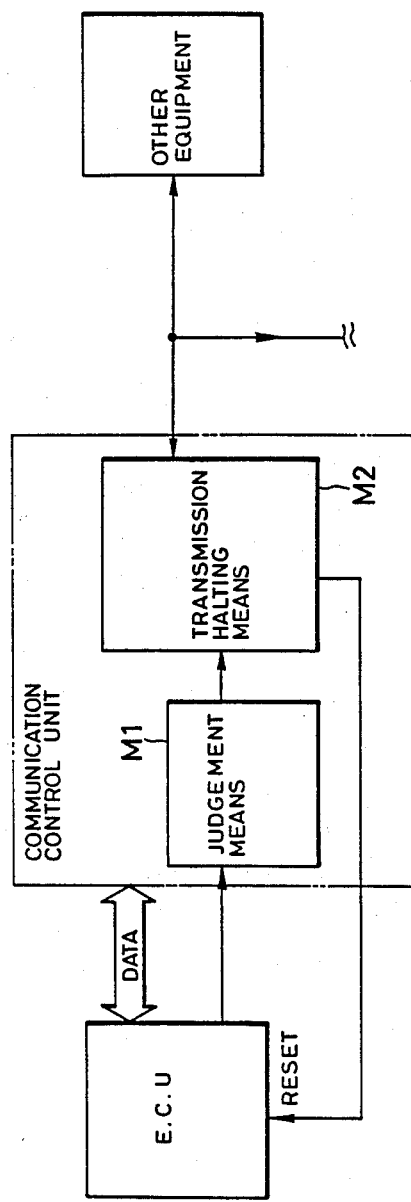
FIG. 1 is a block diagram of the basic configuration of a communication control unit according to the present invention.
Figure 2:
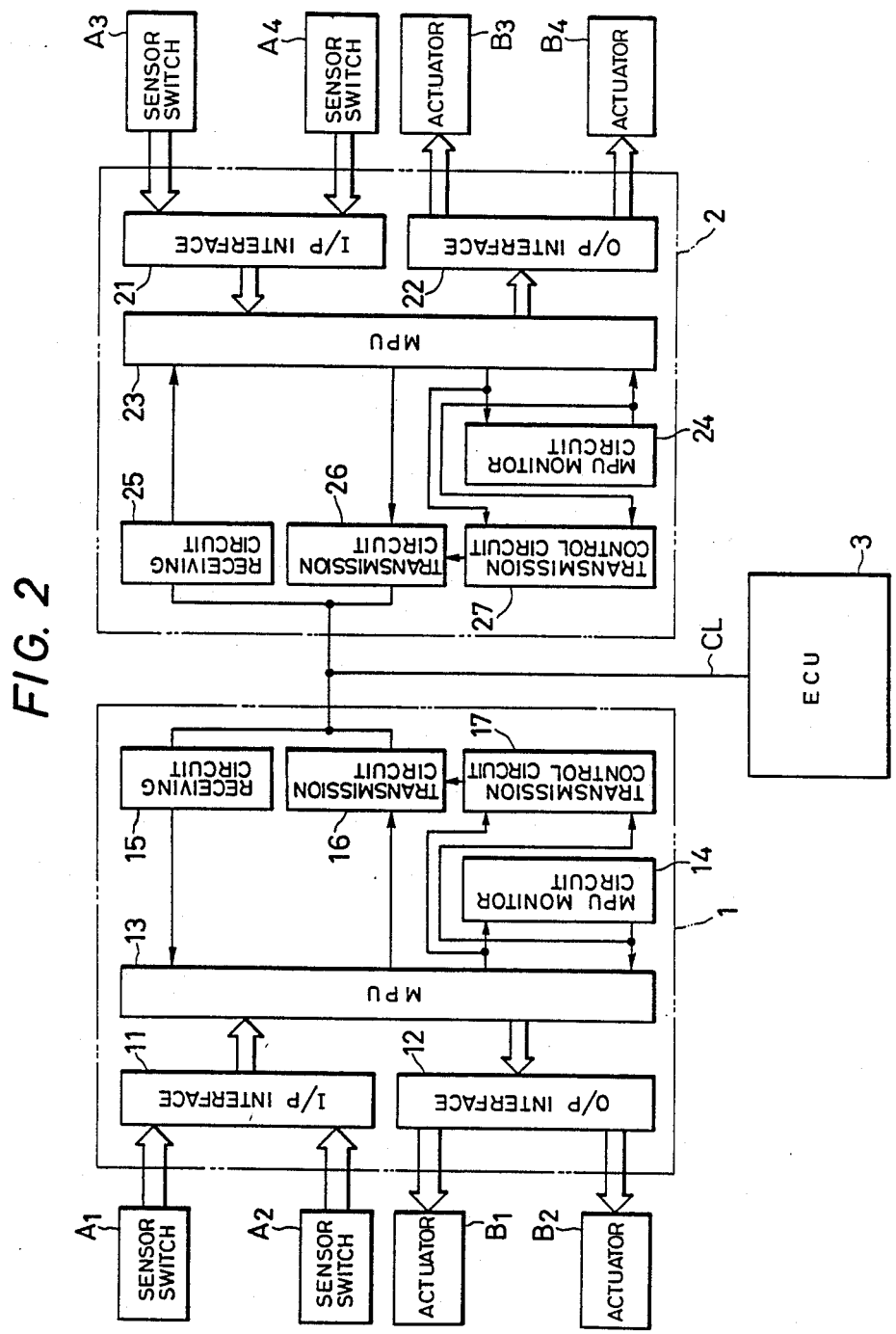
FIG. 2 is a block schematic diagram to illustrate the configuration of an embodiment of a communication control unit according to the present invention.

A preferred embodiment of the present invention will be described referring to the drawings. FIG. 2 is a general block diagram of this emmbodiment, in which communication control units are formed integrally with respective electronic control units (hereinafter referred to as ECUs) designated as 1, 2 and 3.

The ECUs 1 through 3 can respectively consist, for example, of an engine control ECU which executes control of fuel injection and ignition period based upon vehicle speed and engine speed of rotation, etc, a shock absorber control ECU which controls the shock absorbers based upon inputs such as vehicle speed, steering wheel actuation position, etc, and an automatic transmission control ECU for executing automatic changing of the vehicle speed and changing gears on the basis of the shift position of the gear lever in relation to the vehicle speed, etc.

The configuration of each of ECUs 1 and 2 will be described. The ECU 3 has a similar configuration to ECUs 1 and 2, and so description of ECU 3 will be omitted. The ECU 1 contains a microprocessor unit, i.e. a data processing unit (referred to in the following as an MPU) 13, which is made up of a processing unit, memory, etc, and which is connected through an interface 11 for receiving detection input signals from a set of sensor switches designated at $A_1$, $A_2$, and which is also coupled to an output driver 12 which produces drive signals to be supplied to external actuators designated as $B_1$, $B_2$. The ECU 2 similarly includes and MPU 23 which is coupled to receive input signals from switch sensors $A_3$, $A_4$ through an input interface 21, and is coupled to an output driver 22 which produces drive signals to be supplied to actuators $B_3$, $B_4$. The ECUs 1 and 2 further respectively include MPU monitor circuits 14 and 24 for judging whether or not each of MPUs 13 and 23 is functioning normally, and further include respective receiving circuits 15, 25 for receiving transmission signals from other ECUs, respective transmission circuits 16 and 26 for supplying transmission signals to other ECUs, and respective transmission control circuits 17 and 27 for controlling the respective transmission circuits 16, 26 on the basis of the results of judgements made by the respective MPU monitor circuits 14, 24. Each of the receiving circuits 15, 25, and transmission circuits 16, 26, is configured as a serial interface circuit, and is connected over a single common signal line CL to the transmission circuits 16, 26, etc and receiving circuits 15, 25, etc, of other ECUs. Thus, for example, a vehicle speed signal which is supplied as an input from the sensor switch group $A_1$, $A_2$ to the ECU 1 can be transmitted to ECUs 2 and 3. A more detailed description of this communication control unit will be given in the following, and in particular details will be given of the configuration of the transmission circuits 16, 26 and the transmission control circuits 17 of ECU 1, etc, referring to FIG. 3, with the operation being explained with reference to the timing chart of FIG. 4.

Figure 3:
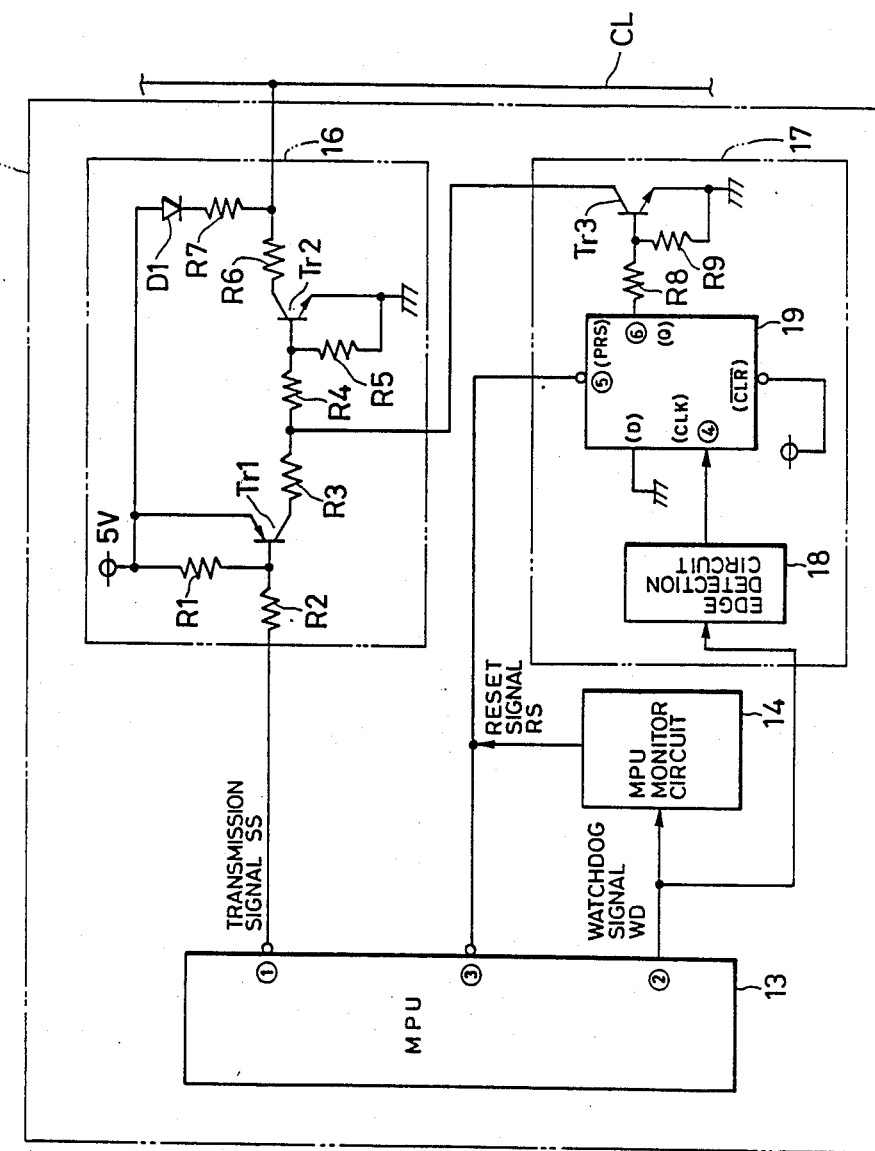
FIG. 3 is a circuit diagram of an MPU, a MPU monitor circuit, a transmission circuit, and a transmission control circuit in an electronic control unit of FIG. 2.

FIG. 3 shows details of the arrangement of MPU 13, MPU monitor circuit 14, transmission circuit 16, and transmission control circuit 17 within the ECU 1 shown in FIG. 2. As shown, the transmission circuit 16 is made up of transistors Tr1, Tr2, resistors R1 through R7, and diode D1. Transistors Tr1 and Tr2 are each set to the ON and OFF states respectively in response to high and low logic levels of a transmission signal SS which is produced from a transmission signal output terminal 1 of MPU 13, and a serial signal SIS varying between a high and a low level is thereby produced from circuit 16 and supplied to the common signal line CL for communication with other ECUs.

The transmission control circuit 17 is made up of an edge detection circuit 18, a D-type flip-flop 19 and resistors R8 and R9, together with a transistor Tr 3.

During usual operation, a pulse signal (referred to in the following as a watchdog signal WD) having a predetermined pulse width $t_0$ is produced from the output terminal 2 of MPU 13. This watchdog signal WD WD is shown in the timing chart of FIG. 4, and is supplied to inputs of the MPU monitor circuit 14 and of the edge detection circuit 18 of the transmission control circuit 17.

The MPU monitor circuit 14 judges whether or not the MPU 13 is operating normally, with this judgement being based upon the condition of the input watchdog signal WD. That is to say, following a low-to-high potential transition of the watchdog signal WD, if the succeeding high-to-low transition of the watchdog signal WD does not take place within a predetermined time interval $t_1$ (where $t_1 > t_0$), then it is judged by the MPU monitor circuit 14 that MPU 13 is operating abnormally, and the MPU 13 is reset to a predetermined initial operating state by means of a reset signal RS which is applied to an input terminal ③ of MPU 13. Specifically, the reset signal RS is caused to go to the low potential level for a predetermined time interval $t_2$, to thereby effect reset of the MPU 13. This reset signal RS is shown in the timing chart of FIG. 4. When the reset signal RS is applied in this manner, MPU 13 is reset to an initial operating status, and execution of initial operations by MPU 13 are started.

As stated above, the watchdog signal WD is also supplied to the edge detection circuit 18 of the transmission control circuit 17. A pulse signal PS1 (which goes from the high to the low level in synchronism with each high-to-low or low-to-high level transition of the watchdog signal WD, and remains at the low level during a predetermined pulse width $t_3$ where $t_3 < t_0$) is supplied to a clock input terminal 4 of the D-type flip-flop 19. This pulse signal PS1 is also shown in the timing chart of FIG. 4. The D-type flip-flop 19 also has a preset terminal 5 which is coupled to receive the reset signal RS which is produced from the MPU monitor circuit 14. The operation of this D-type flip-flop 19 can be classified in accordance with whether (1) the MPU 13 is operating normally, and (2) the MPU 13 is operating abnormally, as follows:

(1) When MPU 13 is operating normally, the reset signal RS produced from the MPU monitor circuit 14 will be at the high level, and hence the control signal PS2 which is produced from the output terminal 6 of the D-type flip-flop 19 will be held continuously at the low level, irrespective of the pulse signal PS1 being applied to the clock terminal 4 of D-type flip-flop 19. (The control signal PS2 is shown in the timing chart of FIG. 4.) As a result, transistor Tr3 will be held in the OFF state.

(2) When MPU 13 is operating abnormally, the reset signal RS produced from the MPU monitor circuit 14 will be at the low level. As a result, the control signal PS2 produced from output terminal 6 will be at the high level (as shown in FIG. 4), and as a result the transistor Tr3 will be set in the ON state. This ON condition of transistor Tr3 will be maintained continuously as a result of the low level state of the reset signal RS until the MPU 13 (which is now in the initial reset state) begins to operate normally. That is to say, the ON state of transistor Tr3 is continued until the watchdog signal WD attains the normal status thereof. If normal operation of the MPU 13 is restored as a result of applying the reset signal RS as described above to MPU 13, then after a time $t_4$ (which is within the time interval $t_1$) has elapsed, following the rising edge of the reset signal RS, generation of the watchdog signal WD pulses with the predetermined pulse width $t_0$ is again started from output terminal 2 of MPU 13. More specifically, if normal operation of MPU 13 is restored by means of the reset signal RS, then a first high-to-low level transition of the watchdog signal WD will occur after time $t_4$, and thereafter regular periodic pulses of the watchdog signal WD will continue so long as operation of the MPU 13 continues to be normal. Based on the watchdog signal WD, the edge detection circuit 18 of transmission control circuit 17 produces pulse signal PS1 (as shown in FIG. 4), and the D-type flip-flop 19 is triggered on the rising edge of the next pulse of signal PS1, whereby control signal PS2 goes to the low level in synchronism with this rising edge of signal PS1. The transistor Tr3 is thereby set in the OFF state.

If on the other hand the MPU 13 is not restored to normal operation as a result of the reset signal RS applied thereto, then the watchdog signal WD pulses will not begin to be produced within the predetermined time interval $t_1$ (i.e. the watchdog signal WD will remain at the high level), and so the MPU monitor circuit 14 will again cause the reset signal RS to go to the low level during time interval $t_2$.

The action of the ON and OFF operations of transistor Tr3 (i.e. on the transmission circuit 16) in response to the output signal from D-type flip-flop 19 are as follows. When transistor Tr3 is in the OFF state, i.e. while the MPU 13 is operating normally, the transistor Tr2 of transmission circuit 16 executes ON and OFF operations in accordance with the transmission signal SS produced from MPU 13, to thereby produce a serial signal SIS on the common signal line CL.

If on the other hand transistor Tr3 is in the ON (i.e. saturated) state, i.e. when MPU 13 is operating abnormally, then transistor Tr2 will be held in the OFF state irrespective of the status of the transmission signal SS, so that MPU 13 is inhibited from supplying an output signal to the common signal line CL.

With the emmbodiment of a communication control unit according to the present invention described above, if MPU 13 enters a fail status as a result of a cause such as external electrical noise or an internal fault, then output of signals to the common signal line CL as a result of operation by MPU 13 is inhibited until the MPU 13 resumes normal operation. Even after reset of the MPU 13 has been executed, no output signal will be supplied to the common signal line CL from the MPU 13 so long as the MPU 13 is operating abnormally, so that sufficient protection is attained against adverse effects being transferred to other ECUs. Furthermore, with the emmbodiment described above, the ECUs 1 to 3 are data-linked by the common signal line CL. However, due to the fact that the supply of signals to the communication signal line CL from an MPU is inhibited so long as that MPU is in a fail status, communication between other ECUs (i.e. ECUs which are operating normally) is maintained. This is extremely effective in ensuring safety of operation of a motor vehicle in which such a communication system is utilized by preventing a failure condition of one electronic control unit from producing adverse effects upon the operation of other electronic control units.

It should be noted that a communication control unit according to the present invention is not limited to the emmbodiment described in detail hereinabove, and that various changes and modifications may be envisaged. For example, the MPU 13 which is reset by the MPU monitor circuit 14 can be a CPU (Central Processing Unit). Furthermore, in the embodiment described above, the MPU monitor circuit 14 utilizes a watchdog signal WD which is specifically produced as an output from MPU 13 for the purpose of monitoring whether or not the MPU 13 is functioning normally. However, it would be equally possible to use some other signal for this purpose, so long as that signal is produced from the MPU 13 periodically while the MPU 13 is operating normally.

From the above description of the preferred emmbodiment, it can be understood that with a communication control unit according to the present invention, if an ECU enters an abnormal condition as a result of some cause such as the effects of external electrical noise or an internal fault, transmission of signals by the electronic control unit is inhibited until the electronic control unit is again judged to be operating normally. As a result, even after reset of the electronic control unit has been executed as an automatic measure for initiating recovery from the failure condition, no output signal will be supplied from that electronic control unit to other electronic control units so long as the electronic control unit in question is operating abnormally, so that sufficient protection is attained against adverse effects of the failure being transferred to other electronic control units.

What is claimed is:

1. A communication control unit for controlling communication between an electronic control unit and other equipment, comprising:

judgment means for judging whether or not said electronic control unit is operating normally, and for resetting said electronic control unit of said electronic control unit is judged to be operating abnormally, and transmission halting means controlled by said judgment means for halting transmission from said electronic control unit if it is judged by said judgment means that said electronic control unit is operating abnormally and for maintaining said halting of transmission by said electronic control unit until it is judged that said electronic control unit is operating normally, wherein said judgment means maintains said reset condition of said electronic control unit for a first predetermined time interval, and in which upon completion of said first predetermined time interval said judgment means acts to terminate said reset condition of said electronic control unit after a second predetermined time interval has elapsed following completion of said first predetermined time interval, unless normal operation of said electronic control unit is judged to be restored within said second predetermined time interval.

2. A communication control unit for controlling communication between a corresponding electronic control unit and at least two other electronic control units, each of said electronic control units comprising a data processing unit, and all of said electronic control units mutually communicating via a single communication signal line, said communication control unit comprising:

a receiving circuit and a transmission circuit for coupling a corresponding electronic control unit to said communication signal line;

judgment means for judging whether or not a data processing unit of said corresponding electronic control unit is operating normally and for resetting said data processing unit if the data processing unit is judged to be operating abnormally; and transmission halting means controlled by said judgment means for halting operation of said transmission circuit if it is judged by said judgment means that said data processing unit is operating abnormally, and for maintaining said halting of transmission circuit operation together with continued operation of said receiving circuit until it is judged by said judgment means that said data processing unit is operating normally.

3. A communication control apparatus for a motor vehicle, the communication control apparatus having a single communication signal line and at least three electronic control units for controlling respective operating functions of said motor vehicle, each of said electronic control units comprising a data processing unit, a receiving circuit and a transmission circuit for transferring data to and from each other electronic control unit via said single communication signal line, each of said electronic control units further comprising:

a monitor circuit for monitoring the operation of said data processing unit to judge whether or not said data processing unit is operating normally and for resetting the data processing unit when the data processing unit is judged to be operating abnormally; and a transmission control circuit controlled by said monitor circuit such that when it is judged by said monitor circuit that said data processing unit is operating abnormally, transmission of data from said data processing unit by said transmission circuit is inhibited while the data receiving operation by said receiving circuit is continued.

* * * * *